US007801207B2

(12) United States Patent
Chen

(10) Patent No.: US 7,801,207 B2
(45) Date of Patent: Sep. 21, 2010

(54) SIGNAL PROCESSING TASK SCHEDULING IN A COMMUNICATION APPARATUS

(75) Inventor: Shaojie Chen, Austin, TX (US)

(73) Assignee: ST-Ericsson SA, Geneva (CH)

( * ) Notice: Subject to any disclaimer, the term of this patent is extended or adjusted under 35 U.S.C. 154(b) by 817 days.

(21) Appl. No.: 11/166,711

(22) Filed: Jun. 24, 2005

(65) Prior Publication Data

US 2007/0009022 A1    Jan. 11, 2007

(51) Int. Cl.
H03H 7/30    (2006.01)
(52) U.S. Cl. ...................................... 375/229
(58) Field of Classification Search ............... 375/219, 375/225, 229, 316, 343, 350
See application file for complete search history.

(56) References Cited

U.S. PATENT DOCUMENTS

| 4,384,361 | A | 5/1983 | Masaki |
| 4,805,165 | A | 2/1989 | Kawamura et al. |
| 4,870,699 | A | 9/1989 | Garner et al. |
| 4,879,758 | A | 11/1989 | DeLuca et al. |
| 4,930,126 | A | 5/1990 | Kazecki et al. |
| 4,996,639 | A | 2/1991 | Ishimoto et al. |
| 5,031,233 | A | 7/1991 | Ragan |
| 5,058,203 | A | 10/1991 | Inagami |
| 5,142,699 | A | 8/1992 | Sato et al. |
| 5,150,361 | A | 9/1992 | Wieczorek et al. |
| 5,151,769 | A | 9/1992 | Immorlica, Jr. et al. |
| 5,241,541 | A | 8/1993 | Farrell et al. |
| 5,280,644 | A | 1/1994 | Vannatta et al. |
| 5,307,066 | A | 4/1994 | Kobayashi et al. |
| 5,355,524 | A | 10/1994 | Higgins, Jr. |
| 5,448,755 | A | 9/1995 | Tanaka |
| 5,471,471 | A | 11/1995 | Freeburg et al. |
| 5,471,663 | A | 11/1995 | Davis |
| 5,475,684 | A | 12/1995 | Shimizu |
| 5,519,711 | A | 5/1996 | Sointula |
| 5,604,928 | A | 2/1997 | Hamano et al. |
| 5,630,224 | A | 5/1997 | Swail |

(Continued)

FOREIGN PATENT DOCUMENTS

CN    101263660 A    9/2008

(Continued)

OTHER PUBLICATIONS

U.S. Appl. No. 10/426,042, filed Apr. 29, 2003, Sooch et al.

(Continued)

Primary Examiner—David C Payne
Assistant Examiner—Leon-Viet Q Nguyen
(74) Attorney, Agent, or Firm—William J. Kubida; Peter J. Meza; Hogan Lovells US LLP

(57) ABSTRACT

A communication apparatus includes a radio frequency (RF) circuit configured to operate on an RF signal, and a digital processing circuit that is coupled to the RF circuit. The digital processing circuit may operate in association with the RF circuit according to a time domain isolation technique. In addition, the digital processing circuit includes a scheduler that may schedule a channel equalization task for each of one or more respective receive time slots. The scheduler may also schedule a decode task to obtain slot allocation information for each of the one or more respective receive time slots.

27 Claims, 5 Drawing Sheets

U.S. PATENT DOCUMENTS

| | | | |
|---|---|---|---|
| 5,636,140 A * | 6/1997 | Lee et al. .................... 370/469 |
| 5,649,160 A | 7/1997 | Corry et al. |
| 5,758,278 A | 5/1998 | Lansdowne |
| 5,764,693 A | 6/1998 | Taylor et al. |
| 5,812,936 A | 9/1998 | DeMont |
| 5,838,741 A | 11/1998 | Callaway, Jr. et al. |
| 5,842,037 A | 11/1998 | Haartsen |
| 5,872,540 A | 2/1999 | Casabona et al. |
| 5,875,449 A | 2/1999 | Ono |
| 5,917,854 A | 6/1999 | Taylor et al. |
| 5,920,592 A | 7/1999 | Tanaka et al. |
| 5,923,761 A | 7/1999 | Lodenius |
| 5,953,640 A | 9/1999 | Meador et al. |
| 6,020,614 A | 2/2000 | Worley |
| 6,243,597 B1 | 6/2001 | Daanen |
| 6,246,335 B1 | 6/2001 | Tsunoda |
| 6,256,337 B1 * | 7/2001 | Hendrickson et al. ....... 375/140 |
| 6,366,622 B1 | 4/2002 | Brown et al. |
| 6,480,553 B1 | 11/2002 | Ho et al. |
| 6,498,819 B1 | 12/2002 | Martin |
| 6,510,185 B2 | 1/2003 | Lee et al. |
| 7,099,384 B1 * | 8/2006 | Jalali et al. .................. 375/229 |
| 7,283,503 B1 * | 10/2007 | Chen et al. .................. 370/337 |
| 7,289,477 B2 * | 10/2007 | Chen et al. .................. 370/337 |
| 7,324,496 B1 * | 1/2008 | Sooch et al. ................. 370/345 |
| 2001/0015963 A1 * | 8/2001 | Tuomainen et al. ......... 370/311 |
| 2002/0080728 A1 | 6/2002 | Sugar et al. |
| 2003/0020521 A1 | 1/2003 | Lee et al. |
| 2004/0090948 A1 * | 5/2004 | Forssell et al. .............. 370/349 |
| 2004/0120435 A1 * | 6/2004 | Yang et al. .................. 375/350 |
| 2005/0041655 A1 * | 2/2005 | Hughes ....................... 370/389 |
| 2006/0133269 A1 * | 6/2006 | Prakash et al. .............. 370/229 |
| 2006/0198325 A1 * | 9/2006 | Gao et al. .................... 370/270 |
| 2006/0234789 A1 * | 10/2006 | Tarokh et al. ............. 455/575.7 |
| 2007/0121537 A1 * | 5/2007 | Mullins et al. .............. 370/319 |

FOREIGN PATENT DOCUMENTS

| | | |
|---|---|---|
| EP | 0447302 A1 | 9/1991 |
| EP | 0447302 B1 | 9/1991 |
| EP | 00463621 A1 | 1/2000 |
| EP | 00463621 B1 | 1/2000 |
| EP | 1 429 480 | 6/2004 |
| EP | 1900109 | 8/2006 |
| WO | WO 01/39406 | 5/2001 |
| WO | 2007/002548 A1 | 1/2007 |

OTHER PUBLICATIONS

Notification of Transmittal of International Search Report, PCT/US2006/024723, Oct. 27, 2006.

* cited by examiner

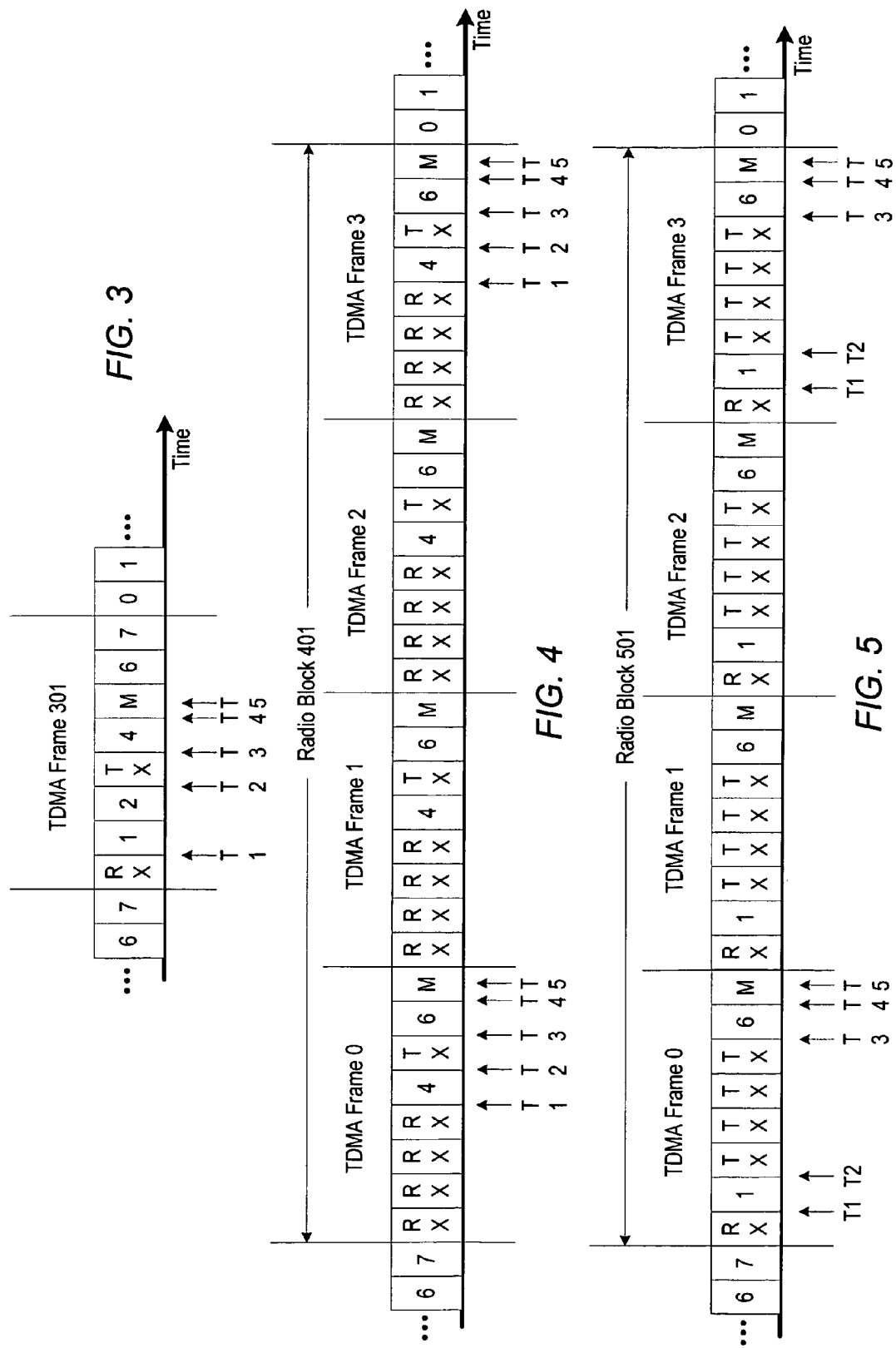

SIGNAL PROCESSING TASK SCHEDULING IN A COMMUNICATION APPARATUS

BACKGROUND OF THE INVENTION

1. Field of the Invention

This invention relates generally to communication apparatus including radio frequency (RF) circuits and signal processing circuits and, more particularly, to signal processing task scheduling.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to baseband and/or up-convert a baseband signal for RF transmission.

In addition to the RF front-end circuitry, which may include sensitive analog circuits, typical wireless communication apparatus may also include digital processing circuitry that performs various digital functions including, for example, low level baseband signal processing, implementation of the communication protocol stack, and various user interface functionality. The digital processing circuitry may include a variety of specific hardware such as a digital signal processor (DSP), an microcontroller unit (MCU), hardware accelerators, memory, and/or I/O interfaces, among numerous other specific hardware devices.

It may be typical for a wireless communication apparatus to include a scheduling mechanism for scheduling tasks associated with processing the received signals. In a conventional communication apparatus, certain signal processing tasks may be scheduled to occur immediately following or during the reception of an RF signal.

SUMMARY

Various embodiments of a communication apparatus and a method for operating the communication apparatus are disclosed. In one embodiment, the communication apparatus includes a radio frequency (RF) circuit coupled to a digital processing circuit. The RF circuit may be configured to operate on an RF signal. In addition, the digital processing circuit may operate in association with the RF circuit according to a time domain isolation technique. The digital processing circuit includes a scheduler that may schedule a channel equalization task for each of one or more respective receive time slots. The scheduler may also schedule a decode task to obtain slot allocation information for each of the one or more respective receive time slots.

In one specific implementation, the RF signal is a signal conforming to a multi-slot radio standard. In addition, the respective receive time slots may correspond to time division multiple access (TDMA) time slots allocated for receiving transmitted data. Further, the slot allocation information may be uplink state flag (USF) information encoded within data received during each of the one or more respective receive time slots.

BRIEF DESCRIPTION OF THE DRAWINGS

FIG. 3 is a timing diagram illustrative of a typical TDMA frame used in conjunction with one embodiment of the communication apparatus 100 of FIG. 1.

FIG. 4 is a timing diagram that illustrates a radio block including multiple TDMA frames used in conjunction with one embodiment of communication apparatus 100 of FIG. 1.

FIG. 5 is a timing diagram that illustrates a radio block including multiple TDMA frames used in conjunction with another embodiment of communication apparatus 100 of FIG. 1.

Figure 1:
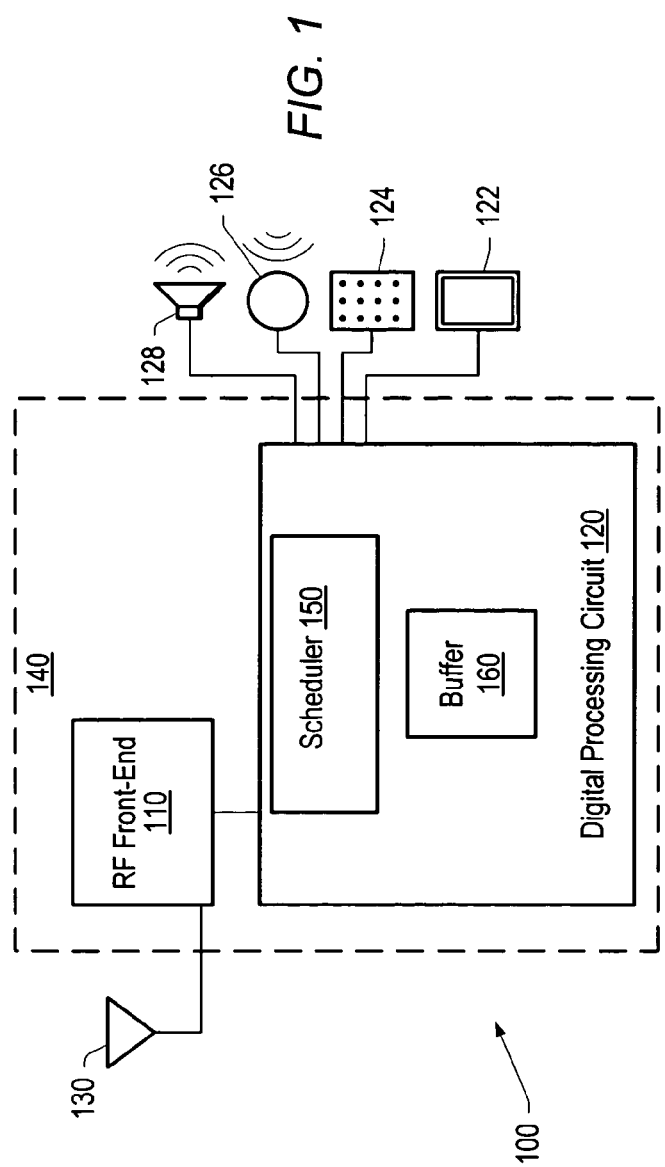
FIG. 1 is a generalized block diagram of one embodiment of a communication apparatus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a generalized block diagram of a communication apparatus 100 is shown. Communication apparatus 100 includes an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. It is noted that in various embodiments, communication apparatus 100 may include additional components and/or couplings not shown in FIG. 1 and/or exclude one or more of the illustrated components, depending on the desired functionality. It is further noted that components that include a reference number and letter may be referred to by the reference number alone where appropriate, for simplicity.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may implement a time-division multiple access (TDMA) standard such as the Global System for Mobile Communications (GSM) standard, the Personal Communications Service (PCS) standard, and the Digital Cellular System (DCS) standard. In addition, many data transfer standards that work cooperatively with the GSM technology platform may also be supported. For example, communication apparatus 100 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, among others.

RF front-end circuit 110 may accordingly include circuitry to provide RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP (not shown in FIG. 1), as well as a variety of specific peripheral circuits such as memory controllers, direct memory access (DMA) controllers, hardware accelerators, voice coder-decoders (CODECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

As shown, digital processing circuit 120 includes a scheduler 150. Scheduler 150 may be provided to schedule signal-processing tasks such as channel equalization and channel decode, for example. Digital processing circuit 120 also includes buffer 160, which may be used to store data while digital processing circuit 120 performs the signal processing tasks on received signals. Further details regarding implementations of scheduler 150 and buffer 160 will be provided below.

Figure 2:
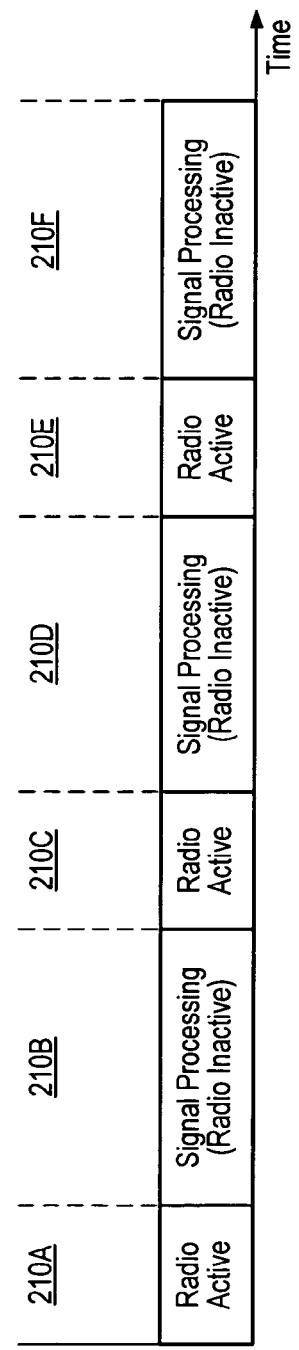
FIG. 2 is a diagram illustrating a set of events that occur in one embodiment of the communication apparatus of FIG. 1 according to time domain isolation.

In one embodiment, RF front-end circuit 110 and digital processing circuit 120 may be integrated on the same integrated circuit die 140. To reduce interference that may be caused by the digital processing circuitry and thus accommodate high performance functionality, communication apparatus 100 may implement a technique referred to as time domain isolation, or TDI. FIG. 2 illustrates a set of events that occur in communication apparatus 100 according to time domain isolation. Broadly speaking, two alternative events take place in such a system: RF reception or transmission, and signal processing. The system arranges in time the RF reception or transmission activities and the signal processing activities to avoid or reduce interference between the RF front-end circuit 110 and the digital processing circuit 120. As described below, buffer 160 may be configured to store data processed by one signal processing task (e.g., equalization) that is awaiting processing by another signal processing task (e.g., channel decode), particularly during intervening periods of RF reception or transmission activity.

As shown in FIG. 2, communication apparatus 100 employs a plurality of timeslots 210A-210F, and so on. During RF timeslots 210A, 210C and 210E, RF front-end circuit 110 may receive RF signals, process the received signals, and store the results. Subsequently, during signal processing timeslots 210B, 210D and 210F, respectively, digital processing circuit 120 may perform signal-processing tasks (e.g., equalization, slot allocation decode, channel decode) on the stored results.

Alternatively, during RF timeslots 210A, 210C, and 210E, RF front-end circuit 110 may transmit RF signals. Thus, in this mode of operation, during signal processing timeslots 210B and 210D, digital processing circuit 120 performs signal processing tasks such as encode and burst formatting, for example on input data (e.g., voice, data), and stores the results. Subsequently, during RF timeslots 210C and 210E, respectively, RF front-end circuit 110 may perform RF operations on the stored results (for example, up-conversion) and transmit an RF signal.

It is noted that, depending on the specific protocol, architecture, and circuitry used, communication apparatus may receive and transmit simultaneously, as desired. More commonly, however, the system either transmits signals or receives signals during any one of RF time-slots 210A, 210C, 210E, etc. For example, a GSM-compliant system or apparatus, such as a mobile telephone that complies with the GSM specifications, either receives or transmits RF signals in one or more bursts of activity during each of RF time-slots 210A, 210C, 210E, etc.

It is further noted that the RF time-slots may have the same or different durations, as desired. RF time-slots may have unequal lengths so as to accommodate a wide variety of circuitry, systems, protocols, and specifications, as desired.

Similarly, the signal-processing time-slots may have similar or dissimilar durations, as desired. Each of signal-processing time-slots 210B, 210D, 210F, etc. may include several other time-slots or time divisions, depending on the particular communication protocol and/or signal-processing techniques and the particular circuitry and technology used. For example, a signal-processing time-slot may include several time-slots, with a portion or a particular circuit of digital processing circuit 120 actively processing signals during one or more of the time-slots.

To implement time domain isolation, digital processing circuit 120 or portions thereof, may be placed in an inactive mode of operation such as a shutdown mode, for example, when an RF timeslot commences (i.e., when the radio is active). In one embodiment, during the inactive mode of operation, a clock signal or signals within digital processing circuit 120 are disabled or inhibited. More specifically, by using static metal oxide semiconductor (MOS) circuitry, for example, the clock signal or signals within the digital processing circuit 120 may be shut down without losing data present within that circuitry. Accordingly, the digital processing circuit 120 can preserve the data within it while the RF front-end circuit 110 is active. Once the RF front-end circuit 110 has completed its reception or transmission (e.g., an RF timeslot has ended), the shutdown mode of digital processing circuit 120 may be discontinued by re-enabling the clock signal or signals. Digital processing operations on the data may then continue or commence. By disabling the clock or clocks in digital processing circuit 120 while RF front-end circuit 110 is active (i.e., receiving or transmitting), the amount of digital noise and thus spurious signals at the RF band of interest may be reduced, thus accommodating high performance. FIG. 3 through FIG. 5 are timing diagrams that illustrate one or more TDMA frames and exemplary operations that occur within a TDI environment, and which are associated with various embodiments of communication apparatus 100 of FIG. 1.

It is noted that although FIG. 2 depicts the operation of the RF front-end circuit 110 and the digital processing circuit 120 as alternative events, these operations need not be mutually exclusive. Generally, it may be desirable to reduce or minimize the amount of overlap between the operation of the RF front-end circuit 110 and the digital processing circuit 120. Depending on a number of factors, however, the active operation of RF front-end circuit 110 and signal processing operations of digital processing circuit 120 may overlap to a certain extent.

It is also noted that in some alternative embodiments, the inactive mode of digital processing circuit 120 may be implemented by causing at least portions of the circuitry to be held inactive or to be otherwise inhibited using other techniques (i.e., other than by disabling a clock signal(s)). For example, power may be removed from particular circuitry within digital processing circuit 120. Likewise, flip-flops or other circuits may be disabled (e.g., through an enable input). In addition, it is noted that some portions of the digital processing circuit 120, such as dynamic memory, may remain active during the shutdown mode (i.e., the circuitry of digital processing circuitry 120 may be partially powered down, disabled, or inhibited during the inactive mode).

As described above, communication apparatus 100 may operate according to such standards as GSM/GPRS/EDGE. In one embodiment, communication apparatus 100 makes use of TDMA techniques to implement such standards. Generally speaking, at least two frequency bands have been allocated for GSM operation. One frequency band is reserved for uplink use (i.e., transmission from the mobile station) and one frequency band is reserved of downlink use (i.e., transmission from the base station). Each frequency band is divided into 124 channels, each 200 kHz wide. Each frequency channel is further subdivided into eight different time slots. Thus, TDMA frame 301 includes a set of eight time slots. Each of the eight time slots may be assigned to an individual user in a system such as the GSM system, when the time slots are used for voice channels only. However, multiple slots may be assigned to one user in a multi-slot system such as the GPRS/EDGE system or other data transfer standard systems, for example. In addition, successive TDMA frames may be grouped together in units referred to as radio blocks. In one embodiment, a radio block may include four TDMA frames.

To accommodate as many users as possible in a system using a data transfer standard such as the GPRS standard, for example, the channels/slots are allocated when data packets are sent or received, and they may be de-allocated after the transmission. The physical channels used for data packets are referred to as packet data channels (PDCH). The PDCHs are chosen from all of the available common channels in the cell. Thus, the channels may be shared by all GPRS and non-GPRS mobile stations located in this cell. Physical channels not currently in use by GSM may be allocated as PDCHs for use as GPRS channels. However, since GPRS may have a lower priority, a PDCH may be de-allocated if there is a demand for services having a higher priority. In addition to the physical channels, a plurality of logical channels, which are located on top of the physical channels, are defined to perform a variety of functions such as signaling, general system information broadcast, synchronization, channel assignment, paging, or payload transport.

In a system employing a data transfer standard (e.g., the GPRS standard), a mobile station may request radio resources for uplink transfer by sending a "packet channel request" on a designated channel. A base station within the network may answer on another designated channel by sending slot allocation information to notify the mobile station which PDCH it may use. The slot allocation information may be transmitted in the downlink to inform the mobile station whether or not the requested uplink channel is free. In one embodiment, the slot allocation information is an uplink state flag (USF). In one implementation, the USF information may be encoded into the transmitted data using a number of bits depending on the coding scheme (e.g., 3-bits for CS-1 coding scheme).

During a given TDMA frame, communication apparatus 100 may receive an RF signal, transmit an RF signal, or monitor one or more channels. Thus, the RF front end 110 of communication apparatus 100 may be active during three windows: one window may be for receiving (RX), one window may be for transmission (TX), and one window may be for monitoring (M). The mobile's regular and periodic switching on and off its RF is called bursting.

Referring to FIG. 3, a timing diagram illustrative of a typical TDMA frame used by one embodiment of communication apparatus 100 of FIG. 1 is shown. Accordingly, within exemplary TDMA frame 301, time slot 0 has been allocated as a receive time slot and designated RX. Similarly, time slot 3 has been allocated as a transmit time slot and designated TX. Time slot 5 has been allocated as a monitor time slot.

As mentioned above, during operation communication apparatus 100 may perform various tasks associated with the transmission, reception and processing of the RF signals. However, since communication apparatus 100 may operate according to time domain isolation, the digital processing circuit 120 may be restricted to performing tasks during certain time slots. For example, during the RX and TX time slots, RF front end 110 may be actively receiving and/or transmitting an RF signal, respectively, while digital processing circuit 120 may be inactive. In contrast, during time slots 1, 2, 6, and 7, digital processing circuit 120 may be active and performing signal processing tasks. In addition, in some embodiments, the RF front end 110 may also use a portion of the Monitor time slot (e.g., time slot 5) to receive the Monitor burst, thus the digital processing circuit 120 may be active during the remaining portion of that time slot.

More particularly, at the start of TDMA frame 301, communication apparatus may be receiving an RF burst during time slot 0. As described above, digital processing circuit 120 may be inactive. Thus, received data may be stored in a buffer such as RX buffer 624 of FIG. 6, for example, until signal-processing tasks are resumed. Accordingly at T1, digital processing circuit 120 may become active while the RF front end 110 may be inactive. As such, digital processing circuit 120 may perform tasks such as channel equalization, slot allocation decode, channel encode/decode, burst formatting, and monitor for example. Thus in one embodiment, scheduler 150 may schedule the channel equalization and slot allocation decode tasks to complete before the end of the frame (e.g., before the end of time slot 7). However, the channel encoder, and burst formatting tasks may be scheduled to complete prior to T2 since digital processing circuit 120 may be deactivated and RF front end 110 may begin transmitting at T2. Between T3 and T4, and from T5 until the end of the frame, digital processing circuit 120 may resume signal-processing tasks.

As described above, in systems such as a GPRS/EDGE system, for example, multiple slots may be assigned to a user. As such, there may be some additional demands on the mobile station in multi-slot operation. For example, in a GPRS or other multi-slot system, channel equalization may be required for each slot (channel). This equalization may be performed using a digital signal processor (DSP) (not shown in FIG. 4) within digital processing circuit 120 that may require a large number of million instructions per second (MIPS). FIG. 4 and FIG. 5 are timing diagrams that illustrate radio blocks including a number of multi-slot TDMA frames used in conjunction with various embodiments of communication apparatus 100 of FIG. 1.

Turning to FIG. 4, a radio block 401 including TDMA frames 0 through 4 is shown. Radio block 401 is representative of one radio block of a plurality of successive radio blocks used by a communication apparatus (e.g., communication apparatus 100) that may be a Class 12 mobile station. Class 12 refers to one particular multi-slot class in which a mobile station may use up to four receive and four transmit slots, as long as the total number of active transmit and receive slots in a frame is five. In the illustrated embodiment, four RX time slots and one TX time slot have been allocated for each of TDMA frames 0-4. Thus, communication apparatus 100 may be receiving 4 bursts and transmitting 1 burst as illustrated. As described above, digital processing circuit 120 may be inactive during these four RX time slots and one TX time slot.

The signal processing tasks that may be performed during radio block 401 of FIG. 4 are similar to the signal processing tasks described in conjunction with the description of FIG. 3. For example, tasks such as channel equalization, slot allocation decode, channel decode, channel encode, burst formatting, and monitor tasks may be performed. The channel encoding and burst formatting tasks may be scheduled to complete prior to T2 (e.g., time slot 4), since digital processing circuit 120 may be deactivated and RF front end 110 may begin transmitting at T2. A monitor task may be performed during the portion of slot 7 in which the digital processing circuit 120 is active (i.e., after T5).

However in FIG. 4, since there are four successive RX time slots in which digital processing circuit 120 may become inactive in each TDMA frame, scheduler 150 may schedule four channel equalization tasks to be performed at T1 (e.g., beginning in time slot 4). In one embodiment, the four equalization tasks may be initiated and completed before the end of each frame (e.g., before the end of time slot 7) and the resulting equalization data may be stored to buffer 160.

Since a given channel comprises the same time slot of each frame in radio block 401, slot allocation information and channel coding information have not been completely received for each respective channel until the data is received in the last frame of the radio block (e.g., in TDMA frame 3). Thus, slot allocation decode and channel decode tasks may be deferred until at least time slot 4 of TDMA frame 3.

After the last RX time slot of TDMA frame 3, enough data has been received to perform slot allocation decode and channel decode tasks. The slot allocation decode has a higher priority than the channel decode since the slot allocation information must be ready prior to the end of radio block 401. Accordingly, in one embodiment, scheduler 150 may schedule four equalization tasks and four slot allocation decode tasks to be initiated and completed in time slots 4, 6, and a portion of time slot 7 (of TDMA frame 3). Any remaining signal processing bandwidth in TDMA frame 3 may be used to begin performing channel decode tasks on the equalization result data for the current radio block 401. However, scheduler 150 may schedule remaining channel decode tasks to be performed on equalization result data from a previous radio block during the time slots in which digital processing circuit 120 is active within TDMA frames 0-1.

In one embodiment, scheduler 150 may schedule an equalization task and a corresponding slot allocation decode task to complete on a given channel before an equalization task and a corresponding slot allocation decode task to be performed for the next channel. For example, at T1 of TDMA frame 3, scheduler 150 may schedule an equalization task and a corresponding slot allocation decode task to complete for the channel corresponding to time slot 0 before an equalization task and a corresponding slot allocation decode task completes for the channel corresponding to time slot 1.

In another embodiment, scheduler 150 may schedule four equalization tasks to be performed and completed before any slot allocation decode tasks occur. However, it is noted that in other embodiments, scheduler 150 may schedule 16 channel equalization tasks to be performed and completed in TDMA frame 3 after T1 and prior to any slot allocation decode or channel decode tasks occurring.

As will be described in greater detail below in conjunction with the description of FIG. 6 and FIG. 8, in one embodiment, results from equalization tasks performed during even numbered radio blocks may be stored in one portion of buffer 160. In contrast, results from equalization tasks performed during odd numbered radio blocks may be stored in another portion of buffer 160.

Referring to FIG. 5, a timing diagram that illustrates a radio block including multiple TDMA frames used in conjunction with another embodiment of communication apparatus 100 of FIG. 1 is shown. Radio block 501 includes TDMA frames 0-4. Similar to radio block 401 of FIG. 4, radio block 501 may also be representative of a Class 12 radio block used by a communication apparatus (e.g., communication apparatus 100). However in the embodiment of FIG. 5, one RX time slot and four TX time slots have been allocated for each of TDMA frames 0-4. Thus, communication apparatus 100 may be receiving 1 burst and transmitting 4 bursts.

In TDMA frame 0, digital processing circuit 120 may be inactive from the start of the frame to T1, between T2 and T3, and between T4 and T5. Thus, scheduler 150 may schedule all channel encode tasks and burst formatting tasks to complete prior to T2. In addition, in one embodiment, scheduler 150 may schedule other tasks such as an equalization task for the data received in time slot 0, and a channel decode task from the previous radio block to occur in the remaining time slots. It is noted that encode tasks for all of the TX slots in all the frames may be completed within frame 0, thus with the exception of the encode tasks, similar timings may be contemplated for remaining TDMA frames 1-2.

In TDMA frame 3, in addition to the tasks described above, scheduler 150 may schedule a slot allocation decode task to be initiated and completed after T1 and before the end of radio block 501. Thus, digital processing circuit 120 may perform the slot allocation decode task for the channel using any remaining MIPS of time slot 1, or in time slots 6 or 7, as desired.

Figure 6:
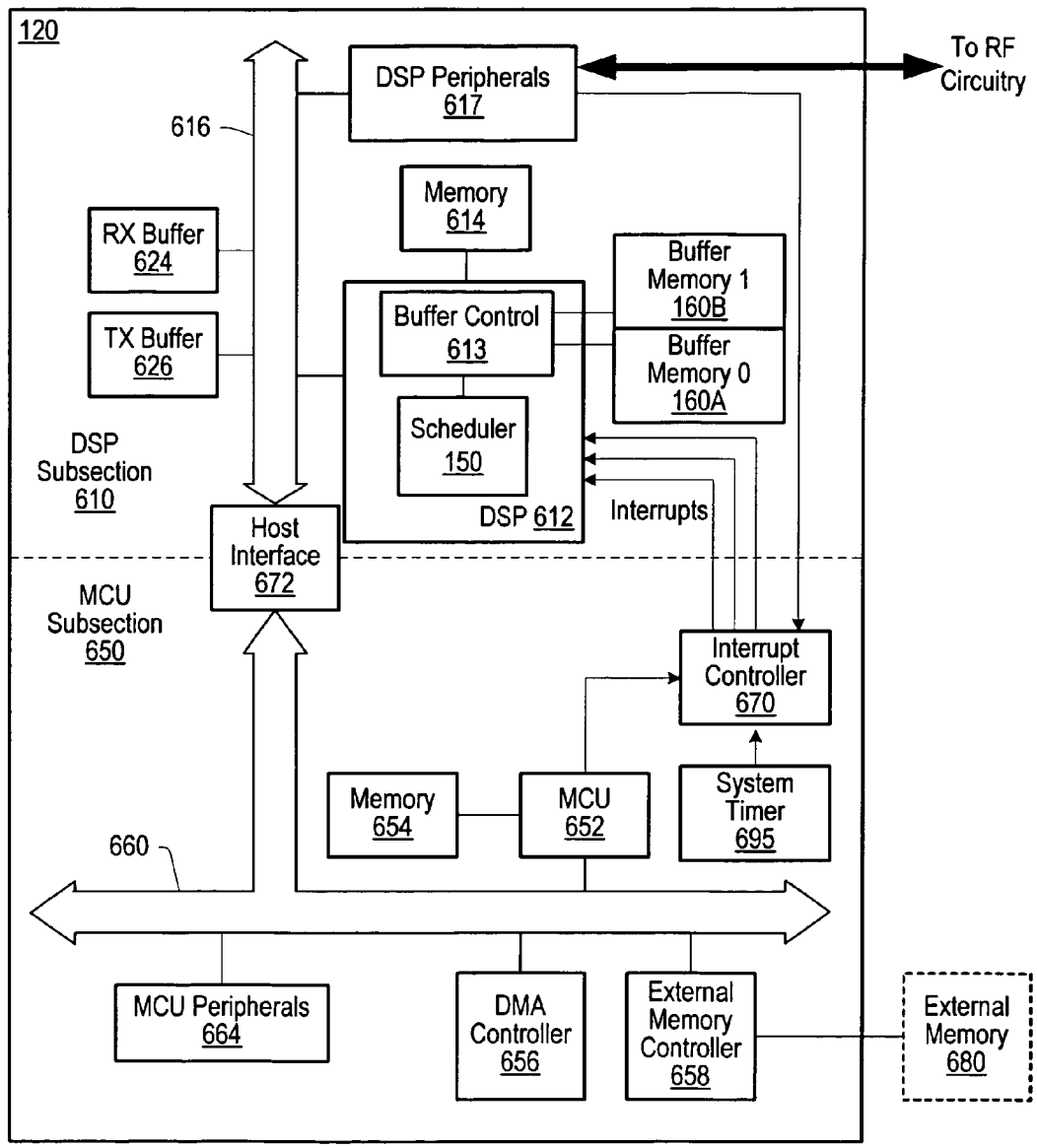
FIG. 6 is a block diagram showing more detailed aspects of one embodiment of the digital processing circuit shown in FIG. 1.

Turning to FIG. 6, a more detailed block diagram of one embodiment of the digital processing circuit 120 of FIG. 1 is shown. Digital processing circuit 120 includes a DSP subsection 610 and a microcontroller unit (MCU) subsection 650. As shown, DSP subsection 610 includes a DSP core 612 coupled to an associated memory 614 and to buffer memory 160A and 160B. DSP core 612 includes a scheduler 150 coupled to a buffer control unit 613. In addition, a receive (RX) buffer 624 and a transmit (TX) buffer 626 are coupled to DSP core 612 via bus 616. Various peripheral devices 617 are coupled to DSP core 612 through one or more buses 616. In the illustrated embodiment, peripherals 617 may include such devices as a hardware accelerator, an audio CODEC (all not shown), for example. It is noted that the specific number and types of peripheral devices provided within DSP subsection 610 may vary depending upon the application as well as the desired functionality and performance.

MCU subsection 650 includes an MCU core 652 coupled to an associated memory 654. Various peripherals including a DMA controller 656 and an external memory controller 658 are shown coupled to MCU 652 through bus 660. Additional MCU peripherals 664 are further shown coupled to bus 660. In the illustrated embodiment, these additional MCU peripherals 664 may include such devices as a UART, a real time clock, and a keypad, for example. In addition, MCU subsection 650 includes a system timer 695 that is coupled to an interrupt controller 670, which is in turn coupled to MCU 652. It is noted that various alternative peripherals may be provided, as desired, depending upon the desired functionality.

A host interface 672 is further shown for accommodating communications between DSP subsection 610 and MCU subsection 650. An external memory 680 is shown coupled to external memory controller 658. External memory 680 may comprise, for example, SRAM, flash, EEPROM, and/or other types of memory. It is noted that various additional external components (not shown in FIG. 6) may be coupled to digital processing circuit 600 including, for example, a keypad, a display, and interface cards such a SIM card, etc.

During operation, DSP subsection 610 may process data received from RF front-end 110 through RX buffer 624. DSP subsection 610 may likewise provide processed data to TX buffer 626, which may then be conveyed to RF front-end circuit 110 through a digital-to-analog converter (not shown). An audio CODEC (not shown) may receive an audio signal from an external microphone such as microphone 126 of FIG. 1 or provide an audio signal to a speaker such as speaker 128 of FIG. 1. DSP core 612 may perform various low-level signal-processing functions such as, for example, filtering, decimation, modulation, demodulation, coding, decoding, correlation and/or signal scaling, as desired.

In one embodiment, MCU subsection 650 is provided to perform higher-level processing functionality. For example, in one implementation, MCU subsection 650 may provide functionality to support the communication protocol stack and the housekeeping tasks as described previously. MCU subsection 650 may additionally implement interfaces such as an MMI (man-machine-interface) and may provide an execution environment for applications running in the system.

To implement a multi-slot system such as a GSM/GPRS/EDGE system, system timer 695 may allow precise generation of control signals including interrupts used in such a system. More particularly, in one embodiment, system timer 695 may be provided to control overall system timing, including the timing of various system events associated with the time domain isolation functionality discussed above. Thus, system timer 695 may define the window of time during which the radio is active (and the times at which digital processing circuit 600 is placed in a shutdown mode). In one embodiment, system timer 695 may generate additional timed events or signals that are indicative of and that are timed in relation to changes to and from the radio active windows (or timeslots).

In one embodiment, interrupt controller 670 may be a programmable interrupt controller that may receive interrupts from system timer 695, DSP peripherals 617, and MCU 652. Interrupt controller 670 may prioritize the received interrupts and provide corresponding interrupts to DSP core 612. When DSP core 612 receives interrupts from interrupt controller 670, scheduler 150 may schedule tasks to process received data or to process data to be transmitted. In one embodiment, scheduler 150 may execute interrupt service routines when scheduling tasks. As described above, these tasks include equalization, slot allocation decode, channel decode, monitor, channel encode, and burst formatting, for example. In one embodiment, scheduler 150 may be implemented as software (e.g., a DSP kernel running on DSP core 612), hardware, or a combination of software and hardware as desired.

In the illustrated embodiment, buffer memory 160A and 160B may store results of signal processing tasks. For example, DSP core 612 may perform equalization tasks on data received from one or more channels. As will be described in greater detail below in conjunction with the description of FIG. 8, in one embodiment the results from equalization tasks performed during even numbered radio blocks may be stored in buffer memory 160A and the results from equalization tasks performed during odd numbered radio blocks may be stored in buffer memory 160B. Thus, when subsequent channel decode tasks are performed using those results, the channel decode tasks may read the result data from buffer memory 160B during even numbered radio blocks and read the result data from buffer memory 160A during odd numbered radio blocks. It is noted that buffer memory 160A and 160B may be portions of buffer memory 160 shown in FIG. 1.

Figure 7:
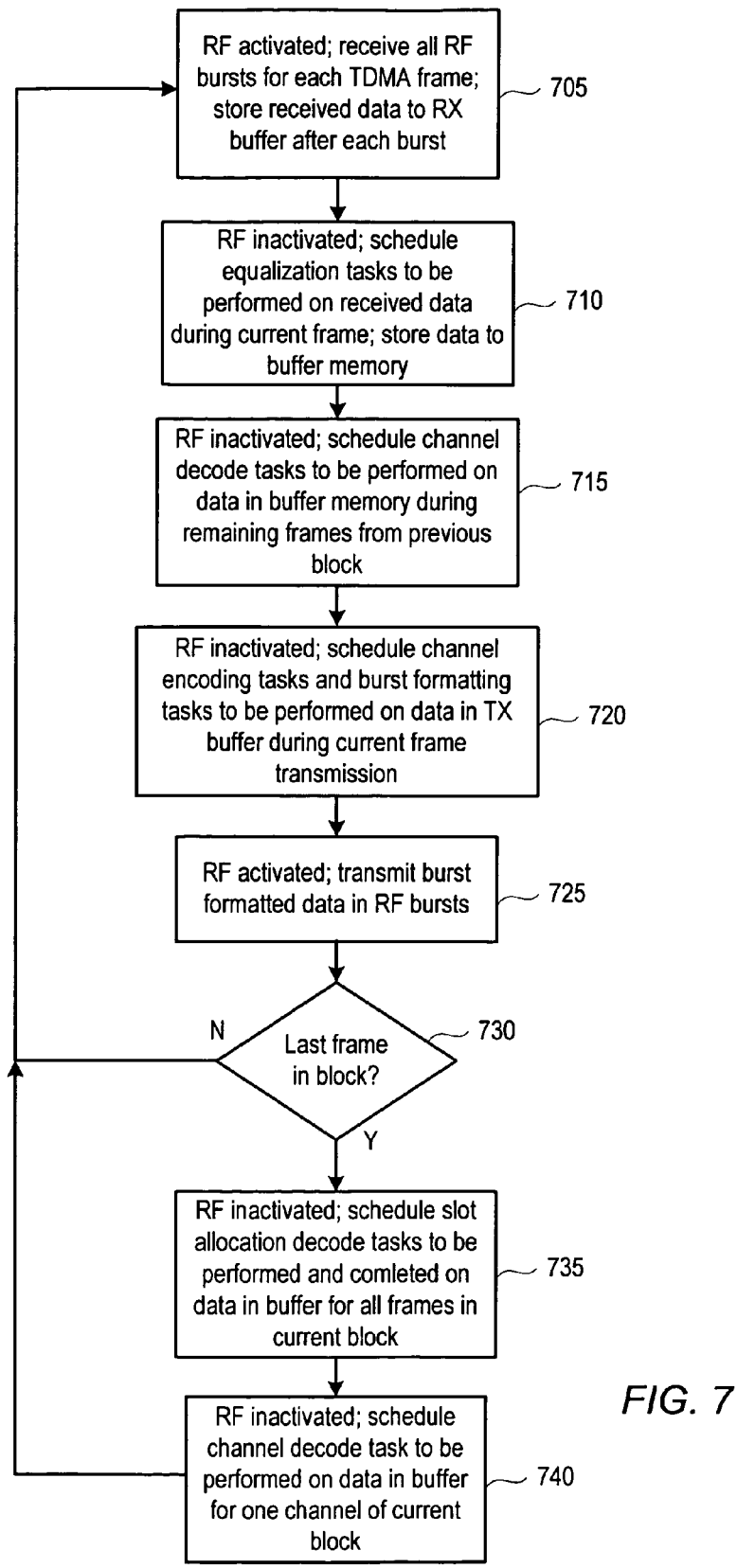
FIG. 7 is a flow diagram describing the operation of one embodiment of the communication apparatus shown in FIG. 1.

FIG. 7 is a flow diagram describing the operation of one embodiment of the communication apparatus 100 of FIG. 1. Referring collectively to FIG. 1 through FIG. 7, the RF front end 110 is active and digital processing circuit 120 is inactive during reception of an RX burst. For example, during time slots 0-3 of each TDMA frame of each radio block 401, the received data may be stored in a buffer such as RX buffer 624 of FIG. 6 (block 705).

During time slots in which the digital processing circuit 120 is active, scheduler 150 may schedule equalization tasks to be performed on the received data. For example, during time slots 4, 6, and part of 7, of each TDMA frame of radio block 401, the RF front end 110 may be inactive and digital processing circuit 120 may perform equalization tasks on the data stored within RX buffer 624. The results of the equalization tasks may be stored within buffer memory 160 (block 710).

In addition, in one embodiment, scheduler 150 may schedule channel decode tasks to be performed on equalization result data from a previous radio block during time slots 4, 6, and part of 7, of TDMA frames 0 and 1 (block 715). Further, in one embodiment, during time slot 4, scheduler 150 may schedule channel encoding and burst formatting tasks to be performed and the resulting data stored within TX buffer 626 (block 720). During time slot 5 of each TDMA frame of radio block 401, RF front end 110 is active and digital processing circuit 120 is inactive so that communication apparatus 100 may transmit an RF burst that may include the data stored in TX buffer 626 (block 725).

If the current frame is not the last frame (e.g., TDMA frame 3) in the current radio block (block 730), the RF front end 110 becomes inactive and operation then proceeds as described above in conjunction with block 705. However, if the current frame is the last frame in the radio block (block 730), during time slots 4, 6, and part of 7 the RF front end 110 becomes inactive, and scheduler 150 may schedule slot allocation decode tasks to complete before the end of the last frame of the current radio block (block 735). For example, scheduler 150 may schedule the slot allocation decode tasks to be performed on the results of the equalization tasks stored in buffer memory 160. As described above, in one embodiment scheduler 150 may schedule a slot allocation decode task to be performed alternately with the equalization tasks. In other embodiments, scheduler 150 may schedule the equalization tasks to complete before any slot allocation decode tasks are performed.

In one embodiment, scheduler 150 may schedule one channel decode task to complete during the last frame and the remaining channel decode tasks may be scheduled to complete in the first two frames of the next radio block. However, the one channel decode task may be performed during the last frame only if there is sufficient MIPS bandwidth available to complete the higher priority tasks (e.g., slot allocation decode) first (block 740). If there is not enough available bandwidth, the one channel decode task may also be performed along with the remaining channel decode tasks during the next radio block. For example, in one implementation, the one channel decode task along with the remaining channel decode tasks may be performed during the first two frames of the next radio block. Operation proceeds as described above in conjunction with block 705.

Figure 8:
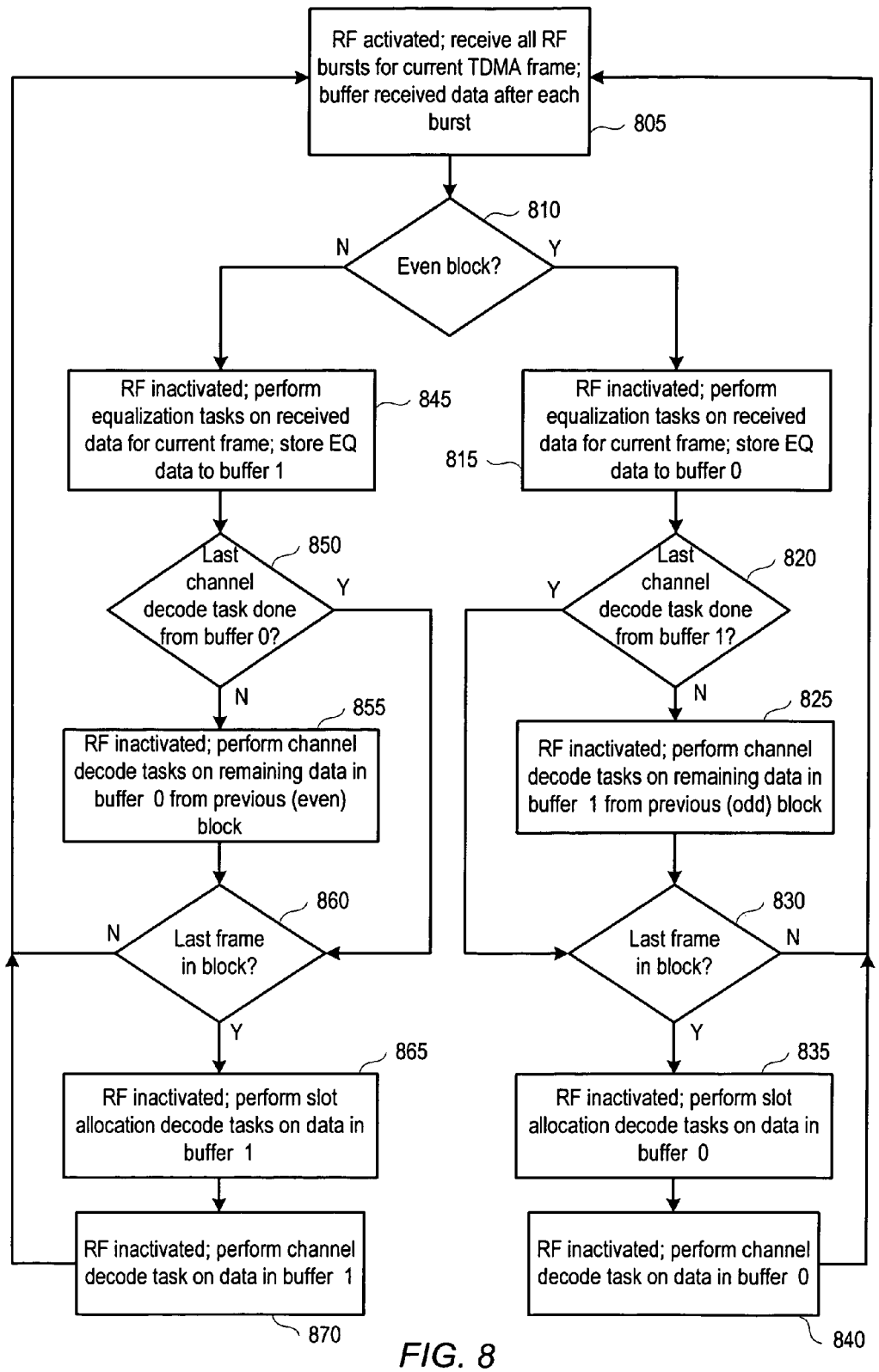
FIG. 8 is a flow diagram describing the operation of another embodiment of the communication apparatus shown in FIG. 1.

FIG. 8 is a flow diagram describing the operation of another embodiment of the communication apparatus 100 of FIG. 1. Referring collectively to FIG. 1 through FIG. 6 and FIG. 8, the RF front end 110 is active and digital processing circuit 120 is inactive during reception of an RX burst. For example, during time slots 0-3 of a current TDMA frame of each radio block 401, the received data may be stored in a buffer such as RX buffer 624 of FIG. 6 (block 805).

In one embodiment, if the current radio block is an even numbered radio block (block 810), during time slots in which the digital processing circuit 120 is active, scheduler 150 may schedule equalization tasks to be performed on the received data and the results may be stored within buffer memory 160A. For example, during time slots 4, 6, and part of 7, of a current TDMA frame of radio block 401, the RF front end 11O may be inactive and digital processing circuit 120 may perform equalization tasks on the data stored within RX buffer 624. Scheduler 150 may provide control signals to buffer control 613 and the results of the equalization tasks may be stored within buffer memory 160A (block 815). In one embodiment, once the last equalization result data is stored to the respective buffer memory (e.g., 160A or 160B) in the last frame of the current radio block, the equalization task may provide an internal indication (e.g., set a flag) to the slot allocation decode task and channel decode task, so that scheduler 150 may schedule those tasks to complete in the appropriate frame and/or radio block.

If the last channel decode task has not been performed on the equalization result data (i.e., equalization result data from a previous (odd) radio block) (block 820), scheduler 150 may schedule channel decode tasks to be performed during time slots 4, 6, and part of 7 of the current TDMA frame of the current even radio block (block 825). More particularly, scheduler 150 may provide control signals to buffer control 613 and equalization result data stored within in buffer memory 160B may be accessed and the channel decode tasks performed.

If the current frame is not the last frame (e.g., TDMA frame 3) in the current radio block (block 830), operation proceeds as described above in conjunction with block 805. However, if the current frame is the last frame in the radio block (block 830), during time slots 4, 6, and part of 7, scheduler 150 may schedule one or more slot allocation decode tasks to be completed (block 835). For example, in one embodiment, scheduler 150 may schedule slot allocation decode tasks to be performed on the results of an equalization task (i.e., equalization result data for channels in the current radio block). Scheduler 150 may provide control signals to buffer control 613 and equalization result data stored in buffer memory 160A may be accessed and the slot allocation decode tasks performed.

Once the slot allocation decode tasks complete, scheduler 150 may schedule a channel decode task to complete in the last frame of the current radio block (block 735). For example, in one embodiment, scheduler 150 may schedule a channel decode task to be performed on the results of an equalization task (i.e., equalization result data for a channel in the current radio block). Scheduler 150 may provide control signals to buffer control 613 and equalization result data stored in buffer memory 160A may be accessed and the channel decode task performed. Operation proceeds as described above in conjunction with block 805.

Referring back to block 820, if the last channel decode task has been performed on the equalization result data stored within buffer 160B, operation proceeds as described above in conjunction with block 830.

Referring back to block 810, in one embodiment, if the current radio block is an odd numbered radio block (block 810), during time slots in which the digital processing circuit 120 is active, scheduler 150 may schedule equalization tasks to be performed on the received data and the results may be stored within buffer memory 160B. For example, during time slots 4, 6, and part of 7, of a current TDMA frame of radio block 401, the RF front end 110 may be inactive and digital processing circuit 120 may perform equalization tasks on the data stored within RX buffer 624. Scheduler 150 may provide control signals to buffer control 613 and the results of the equalization tasks may be stored within buffer memory 160B (block 845).

If the last channel decode task has not been performed on the equalization result data (i.e., equalization result data from a previous (even) radio block) (block 850), scheduler 150 may schedule channel decode tasks to be performed, during time slots 4, 6, and part of 7 of the current TDMA frame of the current even radio block (block 855). More particularly, scheduler 150 may provide control signals to buffer control 613 and equalization result data stored within in buffer memory 160A may be accessed and the channel decode tasks performed.

If the current frame is not the last frame in the current radio block (e.g., TDMA frame 3) (block 860), operation proceeds as described above in conjunction with block 805. However, if the current frame is the last frame in the radio block (block 860), during time slots 4, 6, and part of 7 of TDMA frame 3, scheduler 150 may schedule channel one or more slot allocation decode tasks to be completed (block 865). For example, in one embodiment, scheduler 150 may schedule slot allocation decode tasks to be performed on the results of an equalization task (i.e., equalization result data for channels in the current radio block). Scheduler 150 may provide control signals to buffer control 613 and equalization result data stored in buffer memory 160B may be accessed and the slot allocation decode tasks performed.

Once the slot allocation decode tasks complete, scheduler 150 may schedule a decode task to complete in the last frame of the current radio block (block 860). For example, in one embodiment, scheduler 150 may schedule a channel decode task to be performed on the results of an equalization task (i.e., equalization result data for a channel in the current radio block). Scheduler 150 may provide control signals to buffer control 613 and equalization result data stored in buffer memory 160B may be accessed and the channel decode task performed. Operation proceeds as described above in conjunction with block 805.

Referring back to block 850, if the last channel decode task has been performed on the equalization result data stored within buffer 160A, operation proceeds as described above in conjunction with block 860.

It is noted that, in one embodiment scheduler 150 may schedule a slot allocation decode task to be performed alternately with the equalization tasks in the last frame (e.g., TDMA frame 3). In other embodiments, scheduler 150 may schedule the equalization tasks to complete before any slot allocation decode tasks are performed. In either embodiment, during even radio blocks, scheduler 150 may schedule slot allocation decode tasks to be performed on equalization result data stored within buffer 160A. Likewise, during odd radio blocks, scheduler 150 may schedule slot allocation decode tasks to be performed on equalization result data stored within buffer 160B

It is noted that while the embodiment of FIG. 6 includes a DSP core 612 and an MCU 652, embodiments are also possible that employ other digital processing circuits. For example, some embodiments may employ a DSP in the place of MCU 652. Likewise, embodiments are possible that employ a single MCU (or CPU), without a DSP. Still further embodiments may employ programmable logic devices (PLDs) or other hardware circuits in place of MCU 652.

It is further noted that although the embodiments described above include a communication apparatus that implements a class 12 multi-slot standard, embodiments that employ other multi-slot classes that include other numbers of RX and TX time slots are possible. For example, a given TDMA frame may include two or three RX slots and three or two TX slots, respectively, or any combination thereof.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A communication apparatus comprising:
a radio frequency (RF) circuit configured to operate on a radio frequency signal; and
a digital processing circuit coupled to the RF circuit, wherein the digital processing circuit is configured to operate in association with the RF circuit according to a time domain isolation technique;
wherein the digital processing circuit includes a scheduler configured to:
schedule a channel equalization task for each of one or more respective receive time slots to be performed during time slots reserved for the digital processing circuit; and
schedule a decode task to obtain slot allocation information for each of the one or more respective receive time slots to be performed during the time slots reserved for the digital processing circuit; and
wherein the digital processing circuit further includes a buffer control circuit coupled to the scheduler, a first buffer memory coupled to the buffer control circuit for storing results from equalization tasks performed during even numbered radio blocks and a second buffer memory coupled to the buffer control circuit for storing results from equalization tasks performed during odd numbered radio blocks.

2. The communication apparatus as recited in claim 1, wherein the channel equalization task is performed during any of a plurality of frames of a radio block, each of the frames having a plurality of time slots including time slots reserved for the RF circuit according to the time domain isolation technique and including time slots reserved for the digital processing circuit according to the time domain isolation technique, and wherein the scheduler is configured to schedule the channel equalization and decode tasks to be performed during the time slots reserved for the digital processing circuit.

3. The communication apparatus as recited in claim 2, wherein the decode task is initiated and completed during a last frame of the plurality of frames of the radio block.

4. The communication apparatus as recited in claim 1, wherein the RF signal comprises a signal conforming to a multi-slot time division multiple access (TDMA) standard.

5. The communication apparatus as recited in claim 1, wherein the one or more respective receive time slots correspond to TDMA time slots allocated for receiving transmitted data.

6. The communication apparatus as recited in claim 3, wherein each of the plurality of frames of the radio block includes eight time slots, and wherein the radio block includes four radio frames.

7. The communication apparatus as recited in claim 3, wherein the one or more respective receive time slots includes four respective receive time slots.

8. The communication apparatus as recited in claim 1, wherein the slot allocation information is uplink state flag (USF) information encoded within data received during each of the one or more respective receive time slots.

9. The communication apparatus as recited in claim 1, wherein the scheduler is further configured to schedule a channel decode task for each of the one or more respective receive time slots, wherein the channel decode task is performed after the decode task to obtain slot allocation information has completed.

10. The communication apparatus as recited in claim 1, wherein the scheduler is further configured to schedule an encode task for each of one or more respective transmit time slots, wherein the encode task is initiated and completed during a first frame of a plurality of frames of a radio block and prior to a start of a first transmit time slot of the one or more respective transmit time slots, and wherein each of the frames have a plurality of time slots including transmit and receive time slots reserved for the RF circuit according to the time domain isolation technique and including other time slots reserved for the digital processing circuit according to the time domain isolation technique, the scheduler configured to schedule the encode task to be performed during the other time slots.

11. The communication apparatus as recited in claim 1, wherein the scheduler is further configured to schedule a burst formatting task for each of one or more respective transmit time slots, wherein the burst formatting task is initiated and completed during any of a plurality of frames of a radio block and prior to a start of a first transmit time slot of the one or more respective transmit time slots, and wherein each of the frames have a plurality of time slots including transmit and receive time slots reserved for the RF circuit according to the time domain isolation technique and including other time slots reserved for the digital processing circuit according to the time domain isolation technique, the scheduler configured to schedule the burst formatting task to be performed during the other time slots.

12. The communication apparatus as recited in claim 1, wherein at least a portion of the digital processing circuit is inactivated during an active mode of operation of the RF circuit.

13. The communication apparatus as recited in claim 12, wherein the at least a portion of the digital processing circuit is activated during an inactive mode of operation of the RF circuit.

14. A method comprising:
performing radio frequency (RF) processing on an RF signal and digital processing according to a time domain isolation technique;
wherein the digital processing comprises a scheduler for:
scheduling a channel equalization task for each of one or more respective receive time slots to be performed during time slots reserved for the digital processing;
scheduling a decode task to obtain slot allocation information for each of the one or more respective receive time slots to be performed during the time slots reserved for the digital processing;
coupling the scheduler to a buffer control circuit; and
coupling the buffer control circuit to a first buffer memory for storing results from equalization tasks performed during even numbered radio blocks and to a second buffer memory for storing results from equalization tasks performed during odd numbered radio blocks.

15. The method as recited in claim 14, further comprising performing the channel equalization task during any of a plurality of frames of a radio block, each of the frames having a plurality of time slots including time slots reserved for the RF processing according to the time domain isolation technique and including time slots reserved for the digital processing according to the time domain isolation technique, wherein the channel equalization and decode tasks are scheduled to be performed during the time slots reserved for the digital processing.

16. The method as recited in claim 15, further comprising initiating and completing the decode task during a last frame of the plurality of frames of the radio block.

17. The method as recited in claim 14, wherein the RF signal comprises a signal conforming to a multi-slot time division multiple access (TDMA) standard.

18. The method as recited in claim 14, wherein the one or more respective receive time slots correspond to TDMA time slots allocated for receiving transmitted data.

19. The method as recited in claim 16, wherein each of the plurality of frames of the radio block includes eight time slots, and wherein the radio block includes four radio frames.

20. The method as recited in claim 16, wherein the one or more respective receive time slots includes four respective receive time slots.

21. The method as recited in claim 14, wherein the slot allocation information comprises uplink state flag (USF) information encoded within data received during each of the one or more respective receive time slots.

22. The method as recited in claim 14, further comprising scheduling a channel decode task for each of the one or more respective receive time slots to be performed after the decode task to obtain slot allocation information has completed.

23. The method as recited in claim 14, further comprising scheduling an encode task for each of one or more respective transmit time slots to complete during a first frame of a plurality of frames of a radio block and prior to a start of a first transmit time slot of the one or more respective transmit time slots, each of the frames having a plurality of time slots including transmit and receive time slots reserved for the RF processing according to the time domain isolation technique and including other time slots reserved for the digital processing according to the time domain isolation technique, wherein the encode task is scheduled to be performed during the other time slots.

24. The method as recited in claim 14, further comprising scheduling a burst formatting task for each of one or more respective transmit time slots to complete during any of a plurality of frames of a radio block and prior to a start of the first transmit time slot of the one or more respective transmit time slots, each of the frames having a plurality of time slots including transmit and receive time slots reserved for the RF processing according to the time domain isolation technique and including other time slots reserved for the digital processing according to the time domain isolation technique, wherein the burst formatting task is scheduled to be performed during the other time slots.

25. The method as recited in claim 14, wherein processing according to the time domain isolation technique comprises performing the RF processing while at least a portion of the digital processing is inactive.

26. The method as recited in claim 14, wherein processing according to the time domain isolation technique comprises performing at least a portion of the digital processing while the RF processing is inactive.

27. A mobile telephone comprising:
a first circuit for operating on a radio frequency signal and a second circuit coupled to digitally process information in association with the first circuit according to a time domain isolation technique;
wherein the second circuit schedules a channel equalization task for each of one or more respective receive time slots to be performed during time slots reserved for the second circuit; and
wherein the second circuit schedules a decode task to obtain slot allocation information for each of the one or more respective receive time slots to be performed during the time slots reserved for the second circuit;
a buffer control circuit coupled to the second circuit; and
a first buffer memory coupled to the buffer control circuit for storing results from equalization tasks performed during even numbered radio blocks and a second buffer memory coupled to the buffer control circuit for storing results from equalization tasks performed during odd numbered radio blocks.

* * * * *